US008678479B2

(12) United States Patent
Jaynes

(10) Patent No.: US 8,678,479 B2
(45) Date of Patent: Mar. 25, 2014

(54) MODIFIED TRUCK CAB ROOF ASSEMBLY AND ASSOCIATED METHOD OF MODIFICATION

(71) Applicant: Fontaine Modification Company, Charlotte, NC (US)

(72) Inventor: Dan R. Jaynes, Mount Holly, NC (US)

(73) Assignee: Fontaine Modification Company, Charlotte, NC (US)

( * ) Notice: Subject to any disclaimer, the term of this patent is extended or adjusted under 35 U.S.C. 154(b) by 0 days.

(21) Appl. No.: 13/673,344

(22) Filed: Nov. 9, 2012

(65) Prior Publication Data

US 2013/0127205 A1 May 23, 2013

Related U.S. Application Data

(60) Provisional application No. 61/557,511, filed on Nov. 9, 2011.

(51) Int. Cl.
*B62D 25/06* (2006.01)
*B62D 65/02* (2006.01)

(52) U.S. Cl.
USPC .............. 296/190.1; 296/190.08; 296/37.6; 29/897.2

(58) Field of Classification Search
USPC ............. 296/190.1, 102, 190.08, 37.1, 37.6, 296/37.8, 37.16; 29/897.2
See application file for complete search history.

(56) References Cited

U.S. PATENT DOCUMENTS

| 3,249,382 | A | * | 5/1966 | Swithenbank | 296/26.08 |
|---|---|---|---|---|---|
| 3,908,842 | A | | 9/1975 | Place | |
| 4,081,196 | A | | 3/1978 | Dandridge, Jr. | |
| 4,369,008 | A | | 1/1983 | Cooper | |
| 4,917,435 | A | | 4/1990 | Bonnett et al. | |
| 5,033,567 | A | | 7/1991 | Washburn et al. | |
| 5,150,942 | A | * | 9/1992 | Fujan et al. | 296/190.03 |
| 5,165,838 | A | | 11/1992 | Kallansrude et al. | |
| 5,218,792 | A | | 6/1993 | Cooper | |
| 5,263,757 | A | * | 11/1993 | Reed | 296/24.43 |
| 5,271,705 | A | | 12/1993 | Pijanowski | |
| 5,769,486 | A | | 6/1998 | Novoa et al. | |
| 5,863,093 | A | * | 1/1999 | Novoa et al. | 296/190.01 |
| 6,260,912 | B1 | * | 7/2001 | Mondragon et al. | 296/190.08 |
| 6,531,013 | B2 | | 3/2003 | Nitowski | |

(Continued)

*Primary Examiner* — Lori Lyjak
(74) *Attorney, Agent, or Firm* — R. Blake Johnston; DLA Piper LLP US

(57) ABSTRACT

An assembly and method for modifying a height of a truck cab having a back wall, a pair of A-pillars, a pair of B-pillars and a pair of doors, where each door includes a window frame is disclosed. The assembly includes a pair of first door frame members each adapted to be connected to one of the cut cab B-pillars and a pair of second door frame members, each adapted to be connected to one of the cut cab A-pillars and one of the first door frame members. A windshield header member is adapted to be connected between the pair of second door frame members. Flat bar straps are adapted to be connected between the windshield header member and the back wall and between the pair of first door frame members. A roof panel is adapted to be attached to and supported by the flat bar straps, the windshield header member and the pair of first door frame members. A pair of door top members are adapted to be connected to a window frame of each door. A housing that provides a wedge-shaped recess in the back of the cab is also provided.

30 Claims, 16 Drawing Sheets

(56) References Cited

U.S. PATENT DOCUMENTS

| | | | |
|---|---|---|---|
| 6,883,860 B1 * | 4/2005 | Budge | 296/190.02 |
| 7,025,166 B2 | 4/2006 | Thomas | |
| 7,140,671 B2 * | 11/2006 | Frazier et al. | 296/190.08 |
| 7,393,045 B1 * | 7/2008 | Gonzalez | 296/190.04 |
| 7,395,591 B2 | 7/2008 | Prosser et al. | |
| 7,648,190 B2 | 1/2010 | Timmermans et al. | |
| 7,695,053 B1 | 4/2010 | Boczek et al. | |
| 7,909,355 B2 | 3/2011 | Thedford et al. | |
| 2003/0159264 A1 | 8/2003 | Mcleod et al. | |
| 2003/0234556 A1 * | 12/2003 | Baggett et al. | 296/190.02 |
| 2009/0058147 A1 | 3/2009 | Elbs et al. | |
| 2010/0047046 A1 | 2/2010 | Nespor et al. | |

* cited by examiner

MODIFIED TRUCK CAB ROOF ASSEMBLY AND ASSOCIATED METHOD OF MODIFICATION

CLAIM OF PRIORITY

This application claims priority to U.S. Provisional Patent Application No. 61/557,511, filed Nov. 9, 2011, the contents of which are hereby incorporated by reference.

FIELD OF THE INVENTION

The present invention relates generally to the fields of automotive manufacturing and modification. More specifically, the present invention relates to a modified truck cab roof assembly and an associated method of modification.

BACKGROUND OF THE INVENTION

Automotive manufacturers typically mass produce vehicles in standard configurations, as it is not efficient or economical to produce configurations for which there is limited demand. For example, it may be worth establishing an assembly line for a configuration with a demand of 1,500 units per year, but not for a configuration with a demand of 800 units per year. However, it may be desirable for many automotive fleets to have special features. For example, it may be desirable for garbage trucks to have right-side steering wheels and/or standing driving cabs. Likewise, it may be desirable for auto-haulers to have shorter cabs, such that larger vehicles may be carried over the cab while still allowing 13 ft. 6 in. bridge limits to be met nationally. In such cases, automotive modification companies profitably fill the void, modifying, vehicles to meet the requirements of specific applications.

During the time up until approximately the year 2004, truck modification companies would commonly achieve a lowered cab height by simply lowering the entire cab on the frame so that the cab sits closer to the ground. Emission standards enacted around the year 2004, however, required the addition of exhaust gas recirculation (EGR) systems to trucks. As a result, concern of air flow under the cab prevented extreme lowering of the cab. In 2007, diesel particulate systems were added, which include significant additions to the chassis-mounted muffler systems. These components are typically require air flow around them to function properly. As a result, lowering the cab was no longer a solution to lowering the truck cab height.

Commonly owned U.S. Pat. No. 7,395,591 to Prosser et al. offers an alternative solution for lowering a truck cab height whereby sections of the cab A and B-pillars and back wall are removed. While the Prosser et al. '591 patent provides a standardized process for reducing the cab height of a truck, it is desirable to have a roof assembly specifically adapted for this purpose. It would be particularly advantageous if such an assembly provided the truck with an original equipment manufacturer look.

Furthermore, a critical element in the transporting of automobiles via heavy trucks is the quantity of vehicles that may be carried per truck load. A particular limiting factor is the length of the ears being carried with respect to the "Bumper to Back of Cab" distance. It would be particularly advantageous to provide a truck cab modification that increases the load capacity of the truck by addressing this issue.

BRIEF SUMMARY OF THE INVENTION

In various exemplary embodiments, the present invention provides a modified truck cab having a lower overall height, for auto-hauler applications and the like. This truck cab is produced by removing the steel top of an original equipment manufacturer (OEM) truck cab and replacing it with a plurality of cast aluminum, aluminum, and fiberglass components. The main difficulty in producing such a truck cab is securely mating the old steel components with the new cast aluminum components, as welding such dissimilar metallic materials is not an option and screws/bolts alone do not provide sufficient strength and rigidity. An embodiment of the method of the present invention overcomes this difficulty using a bonding adhesive for dissimilar metallic materials, such as PLEXUS (available from ITW Plexus, Danvers, Mass. USA) or the like, as well as several screw/bolt configurations. The resulting roof assembly is shorter and stronger than a conventional roof assembly and meets the requirements of this specific application.

In one exemplary embodiment, the present invention provides a modified truck cab roof assembly, including: a pair of first door frame members; a pair of second (defined as A-post throughout) door frame members secured to the pair of first door frame members; a windshield header member secured to the pair of second door frame members; a plurality of flat bar straps secured to the first door frame members and the windshield header member; a pair of door top members; and a roof secured to the pair of first door frame members, the pair of second door frame members, the windshield header member, and the plurality of flat bar straps. Preferably, the pair of first door frame members, the pair of second door frame members, the windshield header member, and the pair of door top members are made of cast aluminum. Preferably, the plurality of flat bar straps are made of aluminum. Preferably, the roof is made of fiberglass. Substantially conformal portions of the first door frame members, the second door frame members, and the door top members are inserted into cut portions of pillars and door frames of a conventional truck cab, respectively. Optionally, the substantially conformal portions are one or more of powder coated and painted to prevent corrosion and secured with one or more of an adhesive and screws/bolts. The roof assembly also includes a pair of mirror assemblies that are screwed/bolted to both the second door frame members and associated pillars. Preferably, the roof is affixed to the aluminum flat bar straps using one or more of an adhesive and screws/bolts.

In another exemplary embodiment, the present invention provides a modified truck cab roof assembly method, including: providing a pair of first door frame members; providing a pair of second door frame members secured to the pair of first door frame members; providing a windshield header member secured to the pair of second door frame members; providing a plurality of flat bar straps secured to the first door frame members and the windshield header member; providing a pair of door top members; and providing a roof secured to the pair of first door frame members, the pair of second door frame members, the windshield header member, and the plurality of flat bar straps. Preferably, the pair of first door frame members, the pair of second door frame members, the windshield header member, and the pair of door top members are made of cast aluminum. Preferably, the plurality of flat bar straps are made of aluminum. Preferably, the roof is made of fiberglass. Substantially conformal portions of the first door frame members, the second door frame members, and the door top members are inserted into cut portions of pillars and door frames of a conventional truck cab, respectively. Optionally, the substantially conformal portions are one or more of powder coated and painted to prevent corrosion and secured with one or more of an adhesive and screws/bolts. The roof assembly method also includes providing a pair of mirror assemblies that are screwed/bolted to both the second door frame members and associated pillars. Preferably, the roof is affixed to the aluminum flat bar straps using one or more of an adhesive and screws/bolts.

In another exemplary embodiment, the present invention provides a cab with a housing that provides a concave, wedge-shaped recess in the back wall. This allows an additional car or other vehicle to be transported when the truck is configured as a car carrier as the nose of a vehicle being carried may be positioned within the recess.

BRIEF DESCRIPTION OF TILE DRAWINGS

The present invention is illustrated and described herein with reference to the various drawings, in which like reference numbers are used to denote like assembly components/method steps, as appropriate, and in which.

DETAILED DESCRIPTION OF THE INVENTION

Figure 1:
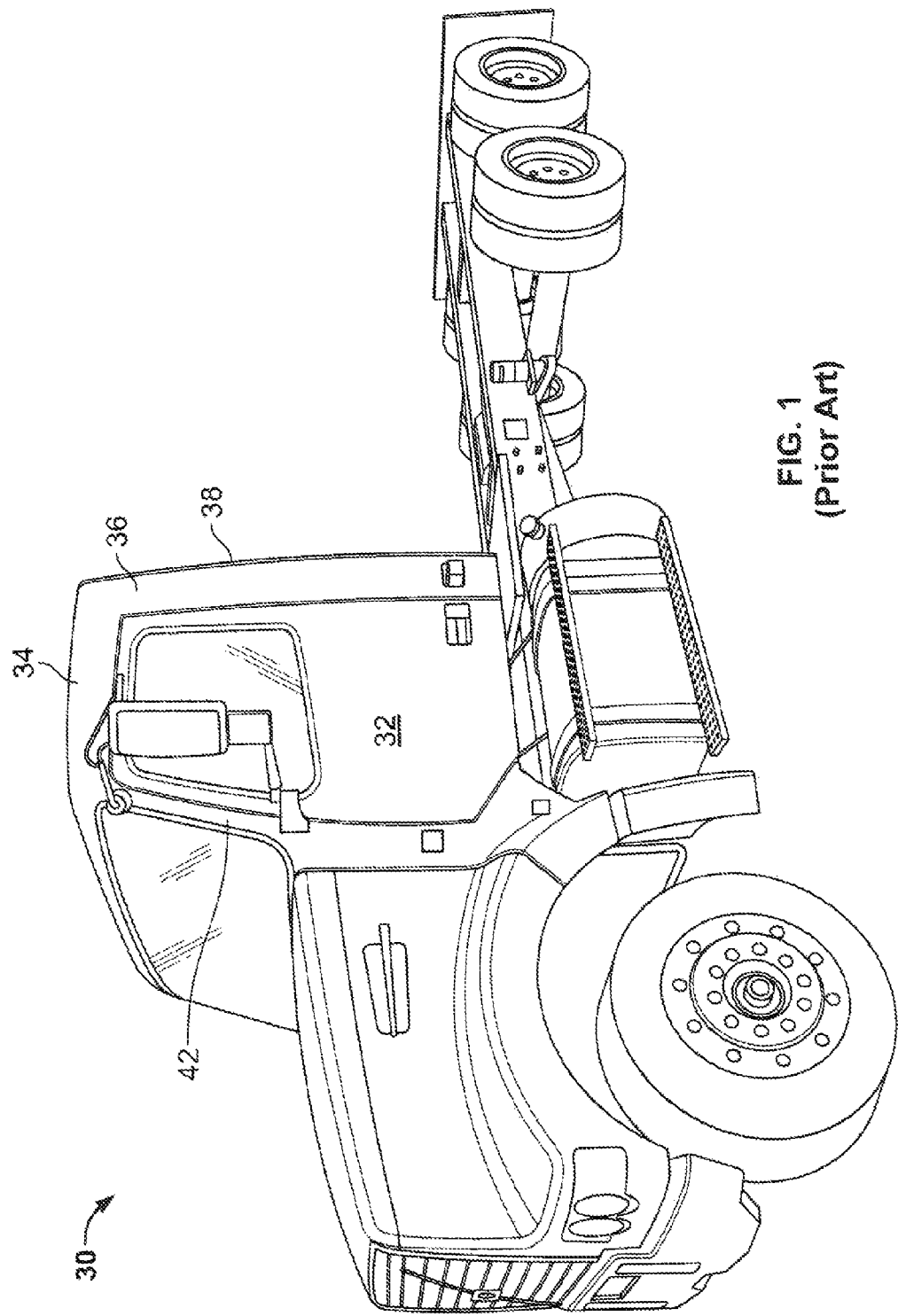
FIG. 1 is a front perspective view of a truck having a standard cab height prior to modification.
Figure 2:
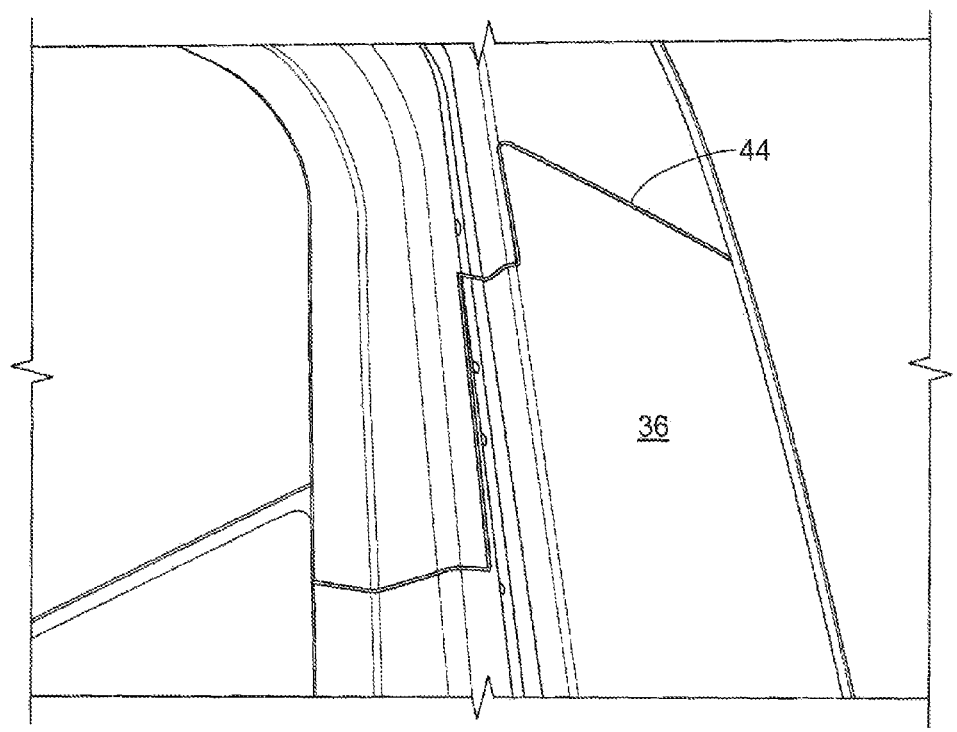
FIG. 2 is front perspective view of B-pillar cut lines formed on the truck cab of FIG. 1.

A prior art truck having a standard cab height is indicated in general at 30 in FIG. 1. As is known in the art, the truck cab includes a pair of doors 32, a roof 34, a B-pillar 36, a back wall 38 and an A-pillar 42. In accordance with the present invention, as an initial step, the A-pillar, B-pillar and back wall are cut and the roof 34 of the truck cab removed, as described in greater detail below. As illustrated, for the B-pillar in FIG. 2, each component is marked with cut lines 44 prior to cutting. A preformed template is preferably used to guide marking of the cut lines.

Figure 3:
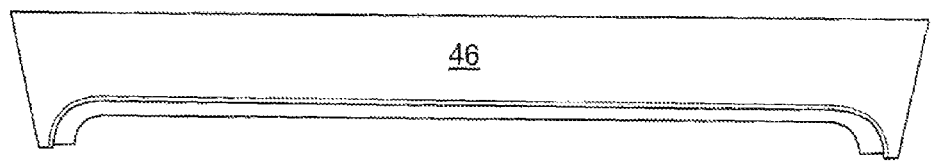
FIG. 3 is a rear elevation view of a section of a truck cab back wall that borders the top edge of the cab rear window and is reused in providing a modified cab height.

With reference to FIG. 3, a portion of the back wall 38 (FIG. 1) that borders the top of the cab rear window, indicated at 46, is cut and retained for reuse as described below.

Figure 4:
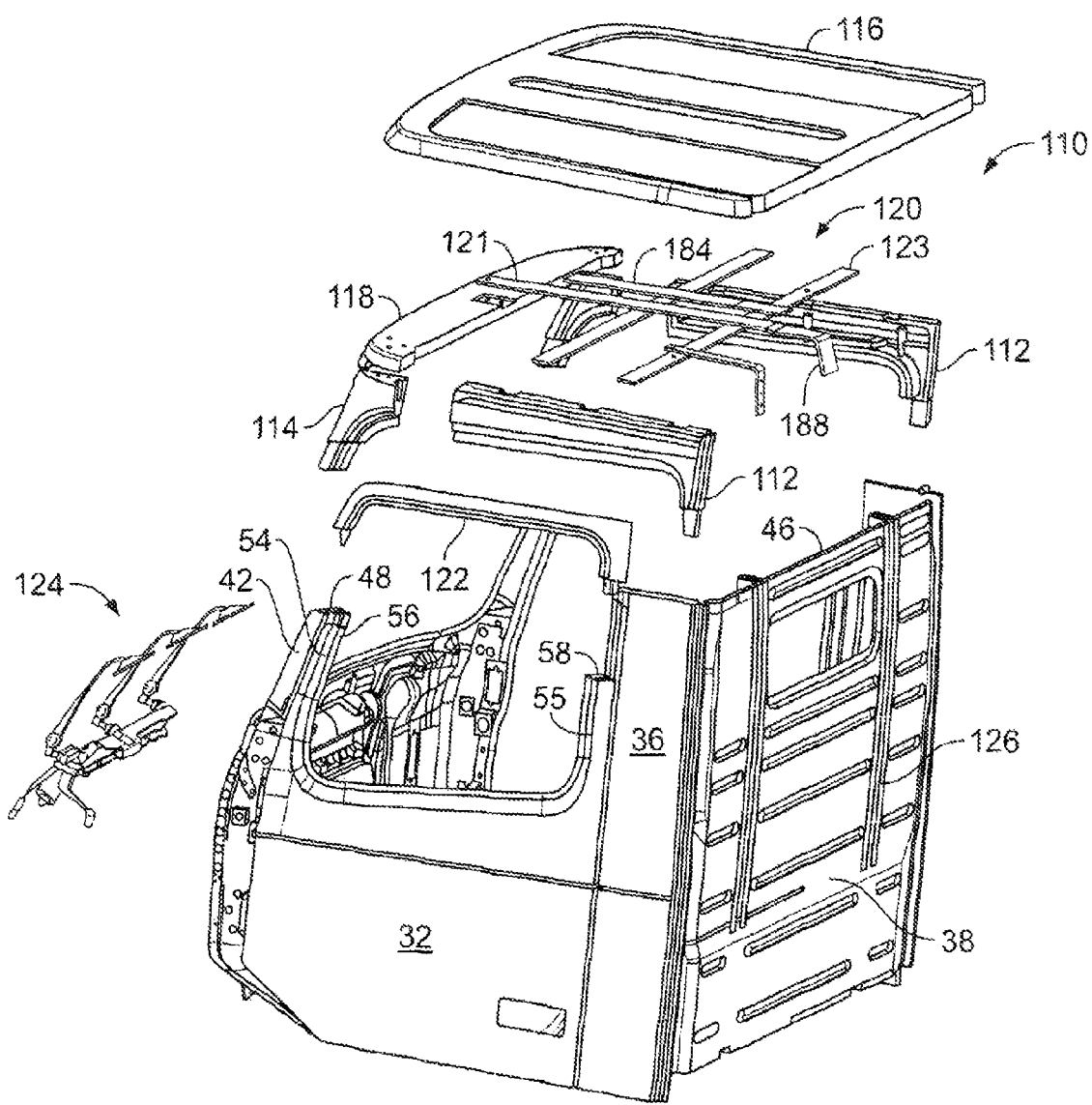
FIG. 4 is an exploded rear perspective view of one exemplary embodiment of the roof assembly of the present invention.
Figure 5:
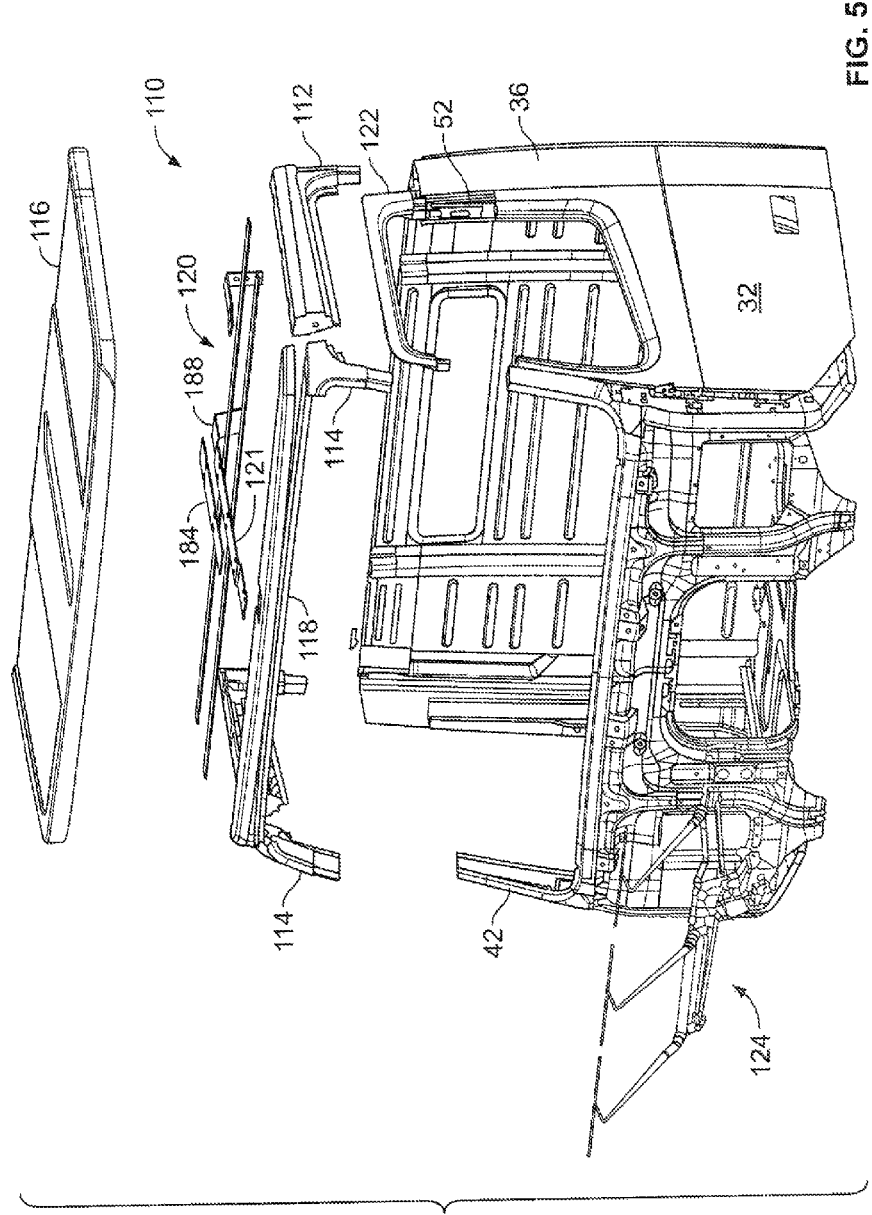
FIG. 5 is an exploded front perspective view of the roof assembly of FIG. 4.

Referring to FIGS. 4 and 5, an embodiment of the roof assembly of the present invention is indicated in general at 110. The roof assembly includes a pair of first door frame members 112 and a pair of second door frame members 114. The first door frame members 112 are secured to the second door frame members 114, thereby forming a pair of unitary door frame members that support the roof panel 116 of the roof assembly 110. Preferably, the first door frame members 112 and the second door frame members 114 are made of cast aluminum, such as sand cast aluminum, or the like. The use of cast aluminum provides cheaper tooling costs (for sandcast tooling), higher surface quality (as opposed to a steel casting) and facilitates design and production of components that mimic the style of OEM parts which improves the appearance of the modified cab.

The roof assembly 110 also includes a windshield header member 118 that is secured to the pair of second door frame members 114 and supports the roof 116 of the roof assembly 110. Preferably, the windshield header member 118 is made of cast aluminum, such as sand cast aluminum, or the like.

The roof assembly 110 further includes a plurality of aluminum flat bar straps 120 or the like that are secured between the first door frame members 112 and the windshield header member 118 (as well as the rear wall of the modified conventional truck cab) and support the roof panel 116 of the roof assembly 110. More specifically, the flat bar straps include a central longitudinal flat bar strap 121 and a number of lateral flat bar straps 123. The roof panel 116 of the roof assembly 10 is made of fiberglass or the like.

Still further, the roof assembly 110 includes a pair of door top members 122. Preferably, the door top members 122 are made of east aluminum, such as sand cast aluminum, or the like.

In preparation for installation, the roof and approximately six to twelve inches of the pillars, door tops, and rear wall of the conventional truck cab are removed. This leaves the truck cab A-pillar 42 with an open top end 48 (FIG. 4) and B-pillar 36 with an opening 52 (FIG. 5). Furthermore, the remaining window frame members 54 and 55 (FIG. 4) of door 32 feature openings 56 and 58, respectively.

A shortened window with an appropriate frame is installed into the modified rear wall. More specifically, the cab rear wall portion 46 of FIG. 3 is welded between the pair of cab back wall uprights 126 in a position so that it forms the top frame portion of the cab back wall rear window. A new cab rear window having a reduced size is then installed in the newly formed opening.

Figure 6:
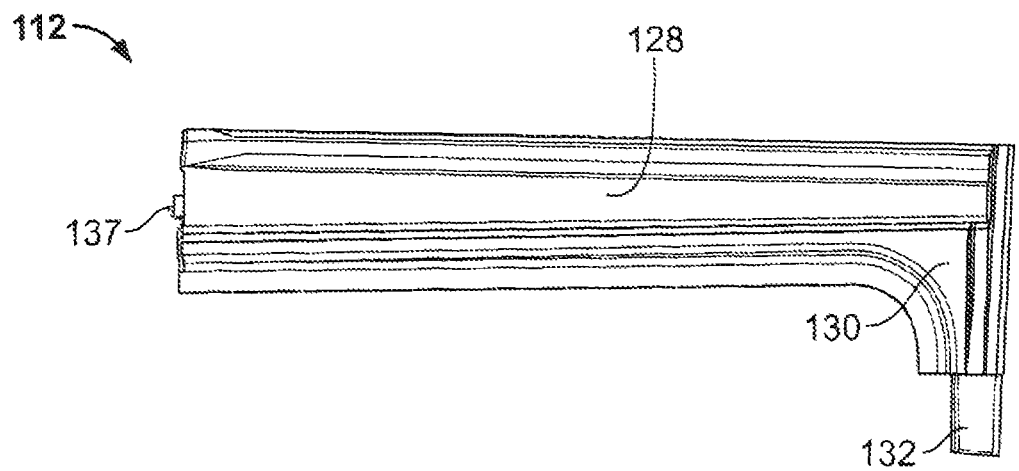
FIG. 6 is an enlarged front side elevation view of a first door frame member of the roof assembly of FIGS. 4 and 5.
Figure 7:
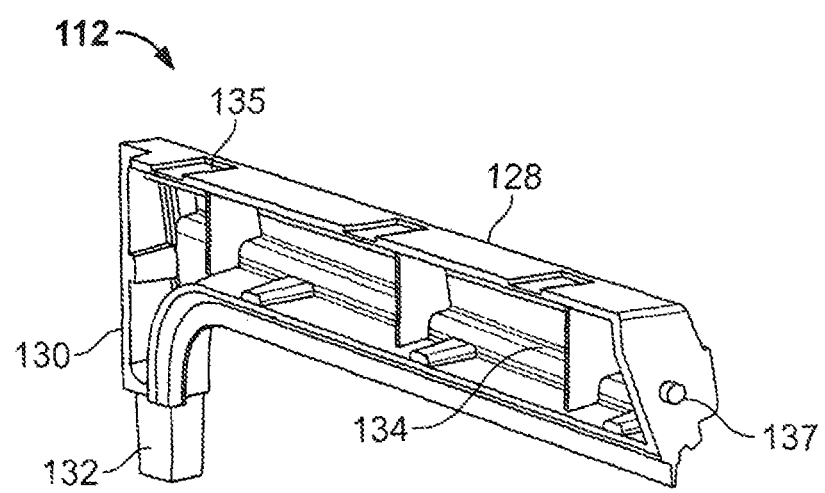
FIG. 7 is a back side perspective view of the first door frame member of FIG. 5.

As illustrated in FIGS. 6 and 7, each first door frame member 112 includes a horizontal portion 128, a downturned portion 130 and a first door frame member tab 132 that extends downward from the downturned portion 130. As indicated at 134, the backside of the first door frame member preferably is cored out to reduce the weight of the part. In addition, the first door frame member includes strap recesses 135 (FIG. 7) and an alignment pin 137, the use of which will be explained below.

Figure 8:
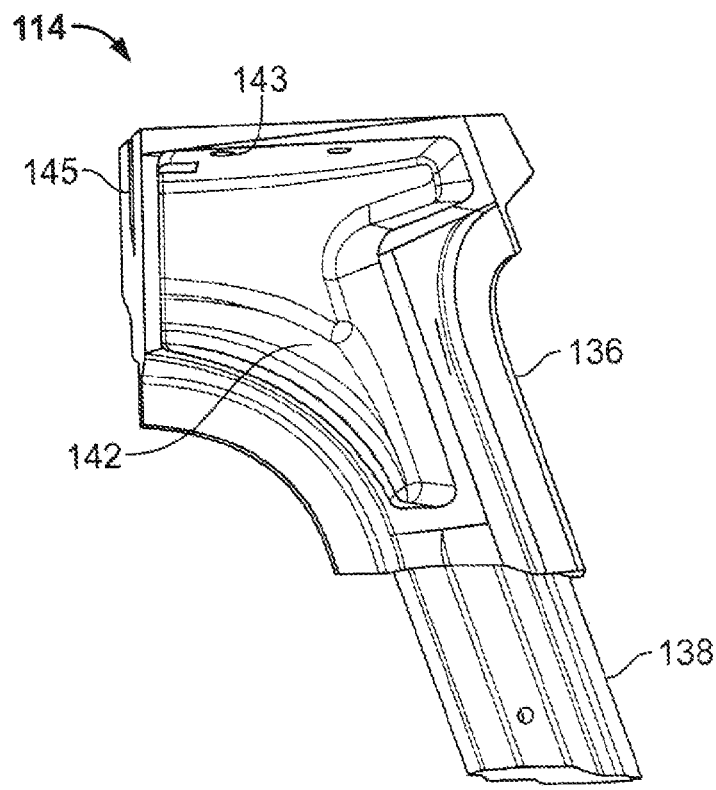
FIG. 8 is an enlarged back side elevation view of a second door frame member of the roof assembly of FIGS. 4 and 5.
Figure 9:
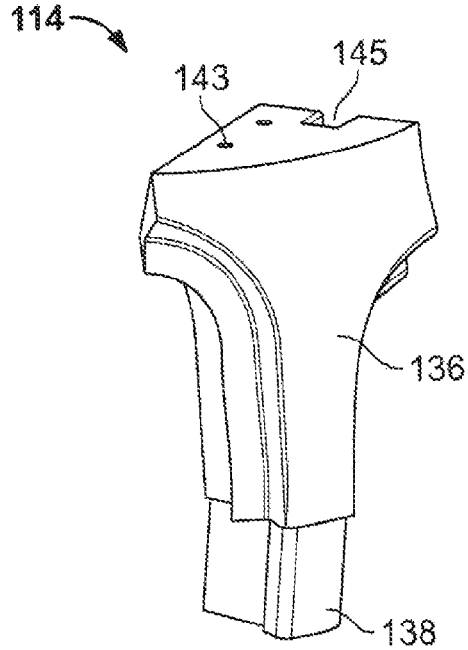
FIG. 9 is a front perspective view of the second door frame member of FIG. 8.

As illustrated in FIGS. 8 and 9, each second door frame member 114 includes a main body 136 that is roughly T-shaped and a second door frame member tab 138 that extends downward from the main body portion. As indicated at 142, the backside of the second door frame member preferably is cored out to reduce the weight of the part. In addition, the top of the main body portion is provided with fastener openings 143 and an alignment notch 145, the use of which will be explained below.

Figure 10:
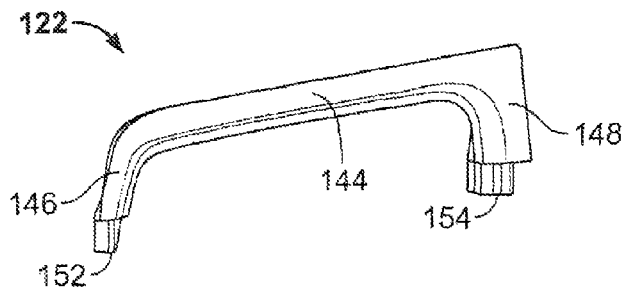
FIG. 10 is an enlarged front perspective view of a door top member of the roof assembly of FIGS. 4 and 5.

As illustrated in FIG. 10, each door top member 122 includes a horizontal portion 144, that borders the top of the truck cab side windows when installed, a leading downturned portion 146 and a trailing downturned portion 148, which are provided with leading and trailing tabs 152 and 154, respectively.

Figure 11:
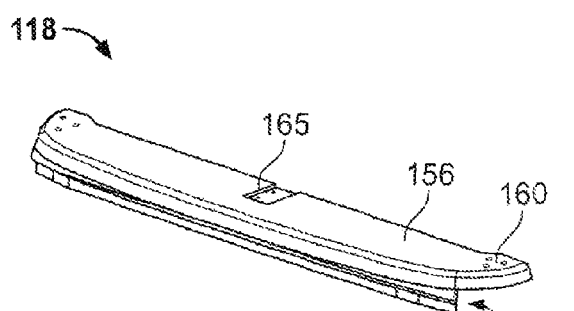
FIG. 11 is an enlarged perspective view of a windshield header member of the roof assembly of FIGS. 4 and 5.
Figure 12:
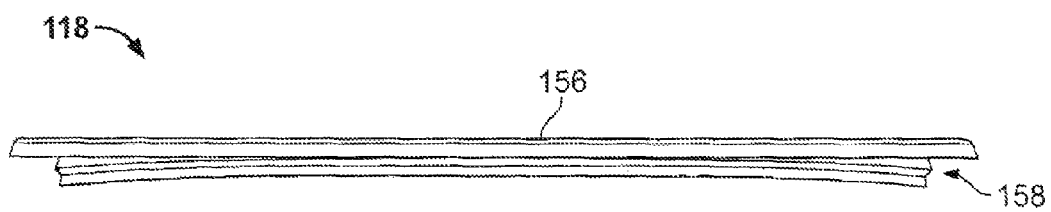
FIG. 12 is a front elevation view of the windshield header member of FIG. 11.
Figure 13:
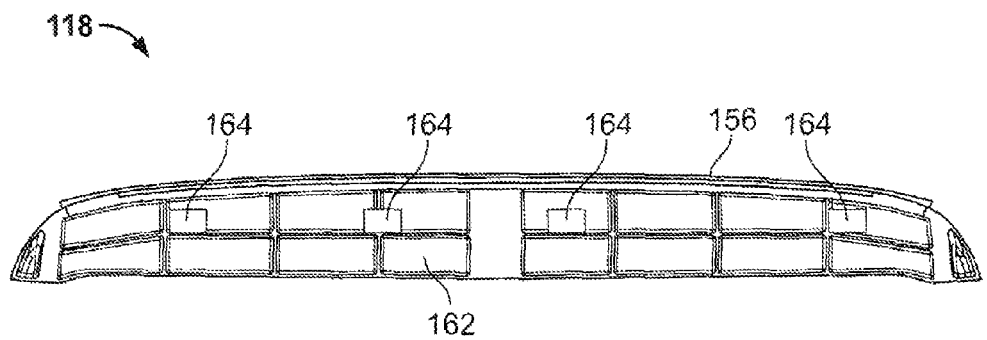
FIG. 13 is a bottom plan view of the windshield header member of FIGS. 11 and 12.

As illustrated in FIGS. 11-13, the windshield header member 118 includes an elongated main body portion 156 having a pair of underside notches 158 on opposite ends with fastener holes 160 (FIG. 11) formed through the body above. As indicated at 162 of FIG. 13, the underside of the windshield header member preferably is cored out to reduce the weight of the part. Plates 164 are also provided on the underside of the windshield header member to mount sun visors for the cab interior. As illustrated in FIG. 11, a strap recess 165 is added in the top surface of the windshield header member 118, the use for which will be explained below.

At this point, substantially conformal portions of the first door frame members 112, the second door frame members 114, and the door top members 122 are inserted into the cut portions of the pillars and door frames of the conventional truck cab, respectively.

Figure 15:
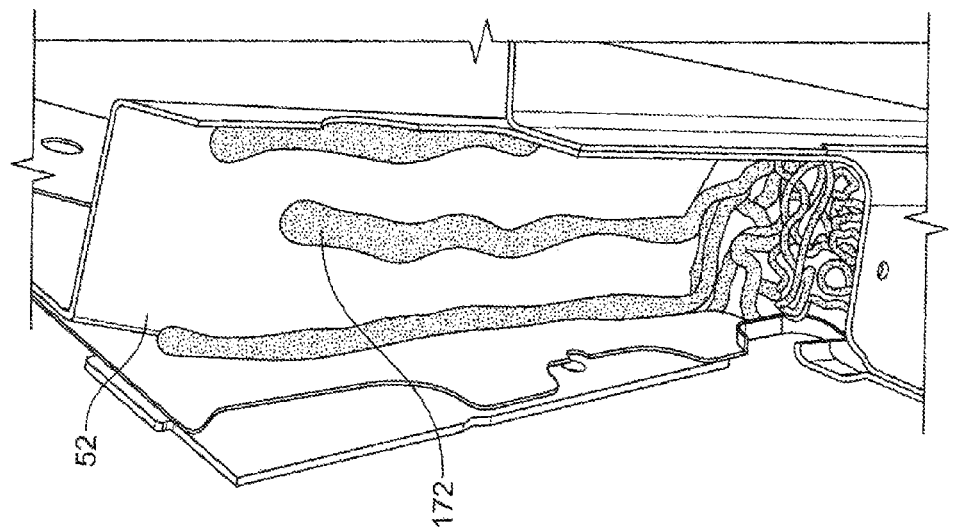
FIG. 15 is a from perspective view of the cut B-pillar of FIG. 14 with adhesive applied.
Figure 14:
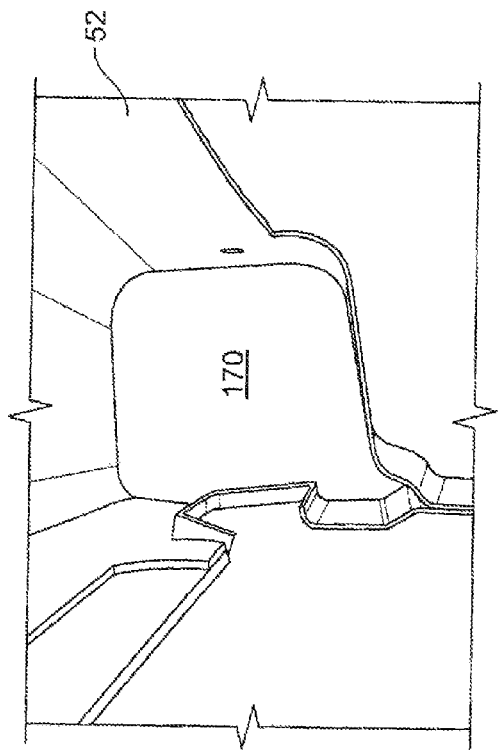
FIG. 14 is a top perspective view of the cut B-pillar of the present invention with foam filler.

More specifically, to install each first door frame member, with reference to FIGS. 14 and 15, a high-density memory foam fill material 170 is initially placed within the opening 52 of cut B-pillar (see also FIG. 5 for cut B-pillar 36 with opening 52) to support the adhesive. Next, as illustrated in FIG. 15, an adhesive, such as PLEXUS 530 (available from ITW Plexus of Danvers, Mass.) is applied in the opening 52 of the B-pillar. Tab 132 (FIGS. 6 and 7) of the first door frame member 112 may then be inserted into the opening 52 (FIGS. 4, 14 and 15) of the B-pillar.

The opening 48 (FIG. 4) of the cut A-pillar 42 is prepared in the same fashion as described above for the B-pillar, preferably using the same high-density memory foam and adhesive. Preferably, holes are drilled in the A-pillar just below the opening 48 to permit insertion of the adhesive. Tab 138 (FIGS. 8 and 9) of the second door frame member 114 is then inserted into the opening 48 (FIG. 4) of the cut A-pillar.

It should be noted that the second door frame member 114 may alternatively be installed before the first door frame member 112.

With reference to FIGS. 6-9, the alignment pin 137 of the first door frame member 112 is inserted into the alignment notch 145 of the main body 136 of the second door frame member 114, and the two abutting ends are then welded together to form a main door frame member.

The windshield header member 118 of FIGS. 11-13 is next positioned between two of the second door frame members with the top portions of the main bodies 136 (FIGS. 8 and 9) of the second door frame members received within the underside notches 158 (FIGS. 11 and 12). Screws are then placed through the fastener holes 160 (FIGS. 11-13) of the windshield header member 118 and into the fastener holes 143 (FIGS. 8 and 9) of the second door frame member 114.

Figure 16:
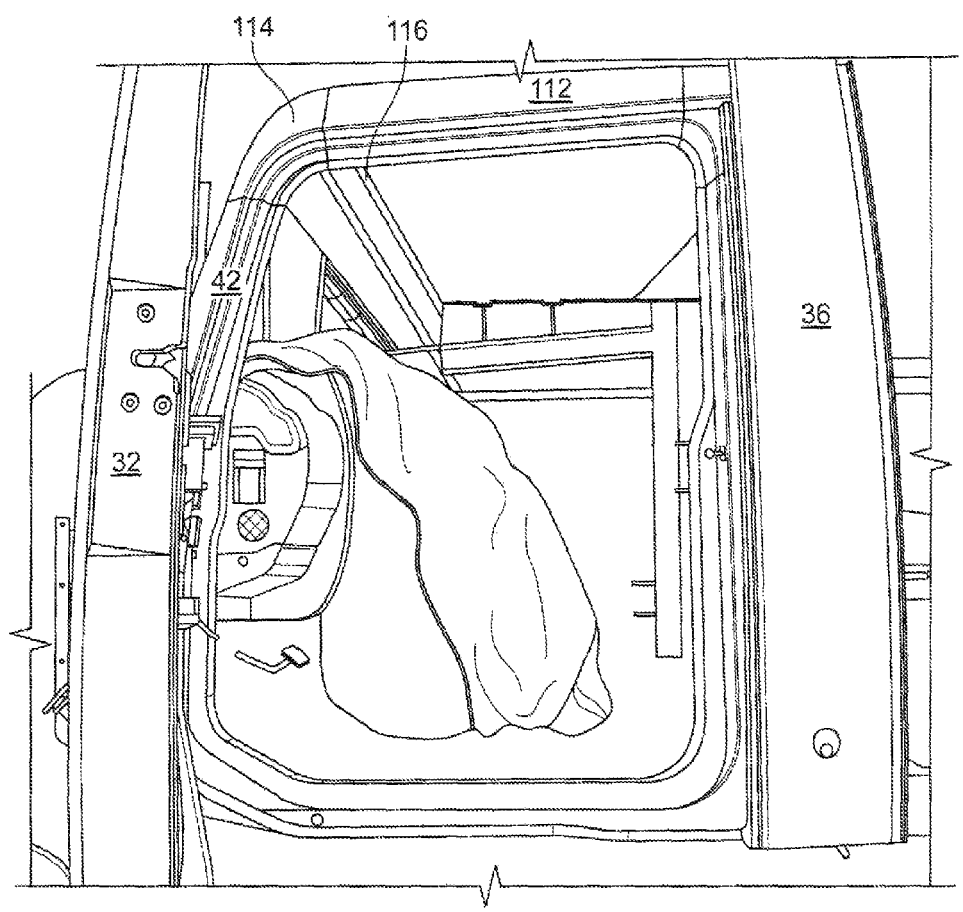
FIG. 16 is a side elevation view illustrating the first and second door frame member assembled to the truck cab of FIGS. 4, 5, 14 and 15.

The joint between each second door frame member 114 and the corresponding first door frame member 112 is then welded as is the joint between each second door frame member and the windshield header member 118. The completed structure is illustrated in FIG. 16.

The openings 56 and 58 (FIG. 4) of the window frame members 54 and 55 of the door 32 are prepared for assembly with the door top member by drilling holes in the window frame members below the openings 56 and 58 to insert the adhesive (preferably the same as used for the A and B-pillars). Once the adhesive is inserted, tabs 152 and 154 (FIG. 10) of the door top member 122 are then inserted into the openings 56 and 58 (FIG. 4) window frame members, respectively.

Preferably, the substantially conformal portions of the roof assembly, such as first door frame member tabs 132 of FIGS. 6 and 7, second door frame member tabs 138 and door top member tabs 152 and 154, are powder coated, painted, or the like to prevent corrosion. As described in the above example, they may be secured with adhesive or the like and, optionally, screws/bolts, thereby securely joining the new aluminum components with the old steel components.

Figure 17:
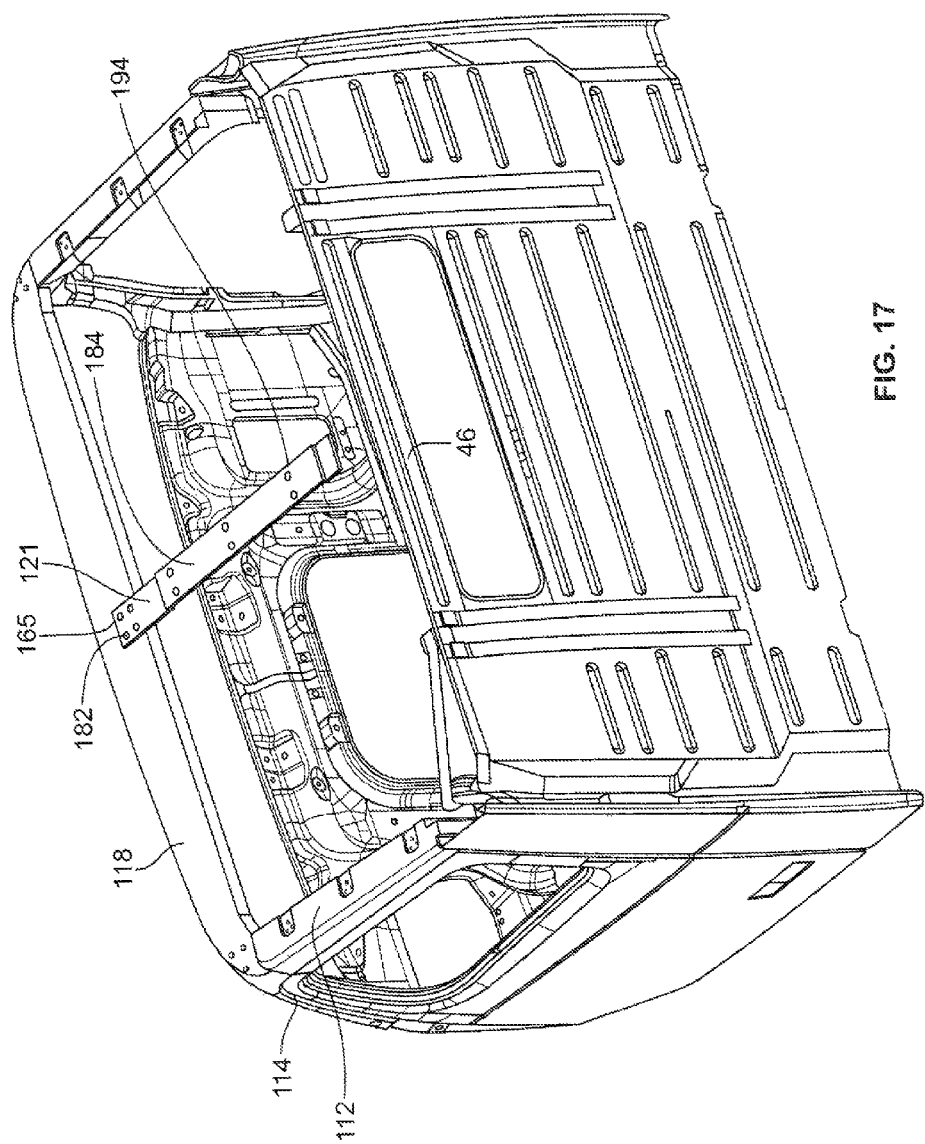
FIG. 17 is a rear perspective view of the cab of FIGS. 4, 5, 14 and 15 with the first and second door frame members, the door top members, the windshield header member and the central longitudinal flat bar strap assembled thereto.

An alternative view of the assembled first door frame member 112, second door frame member 114 and windshield header member 118, as well as the installed back wall portion 46 (FIGS. 3 and 4), is presented in FIG. 17.

As illustrated in FIG. 17, the longitudinal flat bar strap 121 has a leading edge that is positioned in the strap recess 165 (sec also FIG. 11) of the windshield header member 118, and is secured in place with bolts 182. A secondary flat strap bar 184 (see also FIGS. 4 and 5) is secured to the top of the longitudinal flat bar strap 121 and is secured in place with adhesive. This secondary flat bar strip 184, which is preferably around one quarter of an inch thick, adds strength to the longitudinal flat bar strap 121 and provides a delicate slope down from the middle of the roof to provide rain water runoff. The trailing end of the longitudinal flat bar strap 121 is secured by bolts to a generally L-shaped bracket (188 in FIGS. 4 and 5) that is welded to the top portion of the cab back wall.

Figure 18:
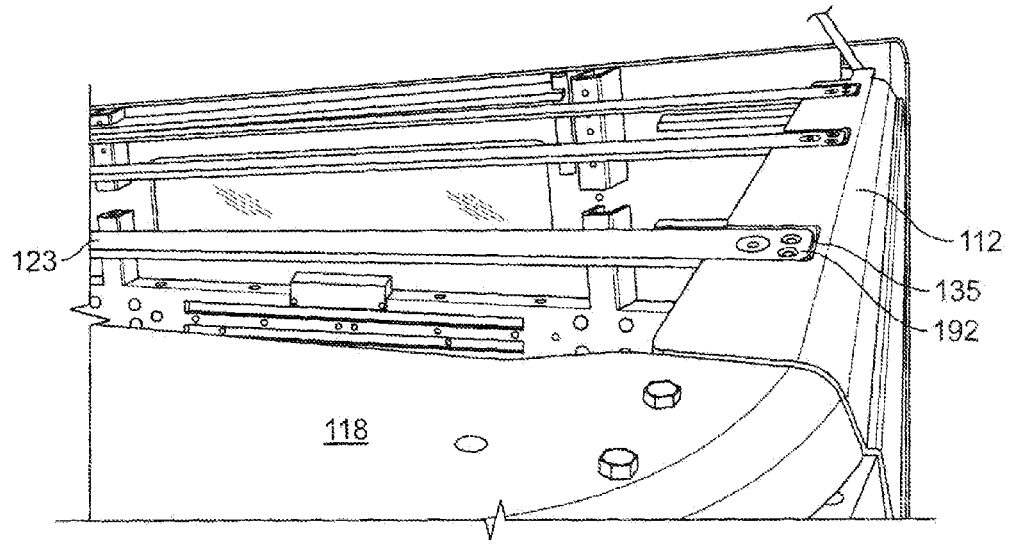
FIG. 18 is a top perspective view illustrating the flat bar straps attached to one of the first door frame members.

As illustrated in FIG. 18, the lateral flat bar straps 123 have ends that are positioned within the strap recesses 135 (see FIG. 7 also) of the first door frame members 112 and held in place via screws 192. The middle portions of the lateral flat bar straps 123 are secured to the longitudinal flat bar strap via screws that engage holes 194 (FIG. 17) of the longitudinal flat bar strap 121.

Adhesive, such as PLEXUS 422, is then applied to the tops of the windshield header member, the first and second door frame members and the longitudinal and lateral straps and the fiberglass roof panel is positioned thereon for attachment. As a result, the roof panel 116 is affixed to the to of the modified truck cab.

Figure 19:
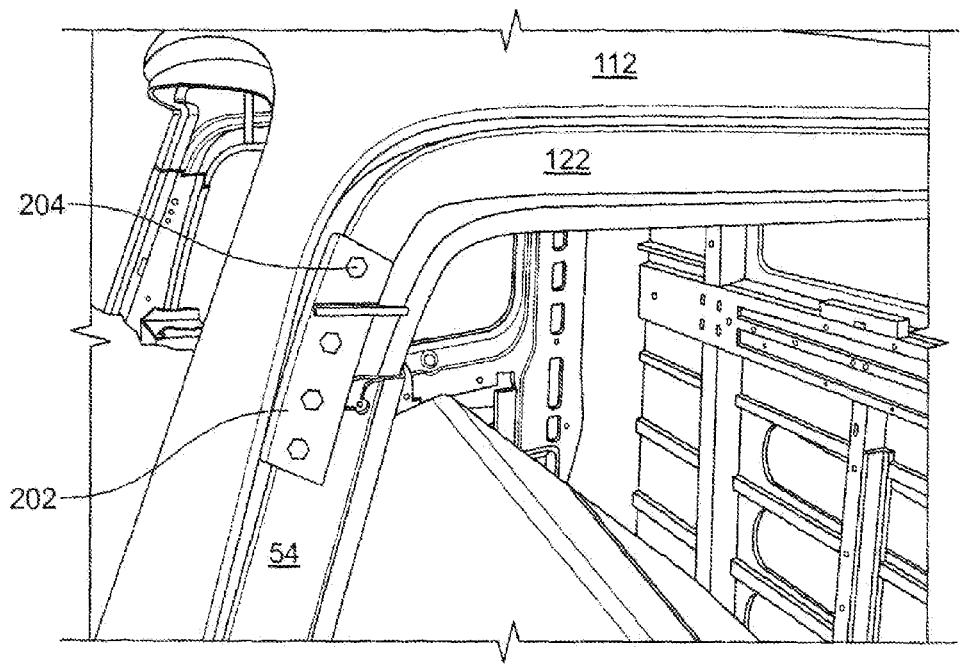
FIG. 19 is a side elevation view of a mirror bracket attached to a cut window frame and a door to member assembled to the truck cab of FIGS. 4 and 5.
Figure 20A:
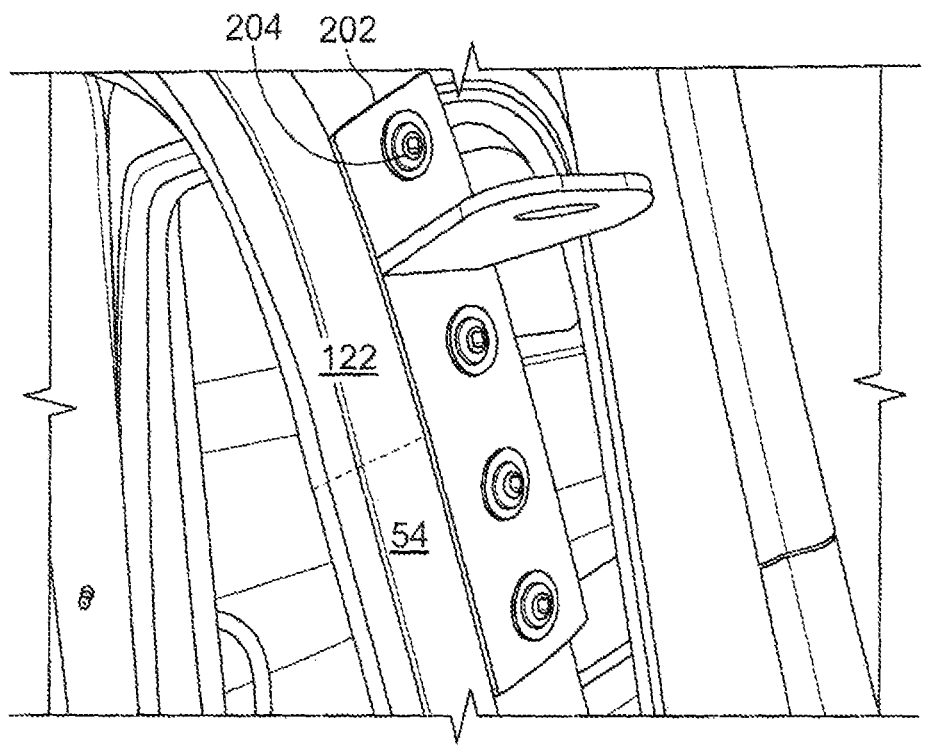
FIGS. 20A and 20B are front perspective and rear perspective views of the mirror bracket of FIG. 19.
Figure 20B:
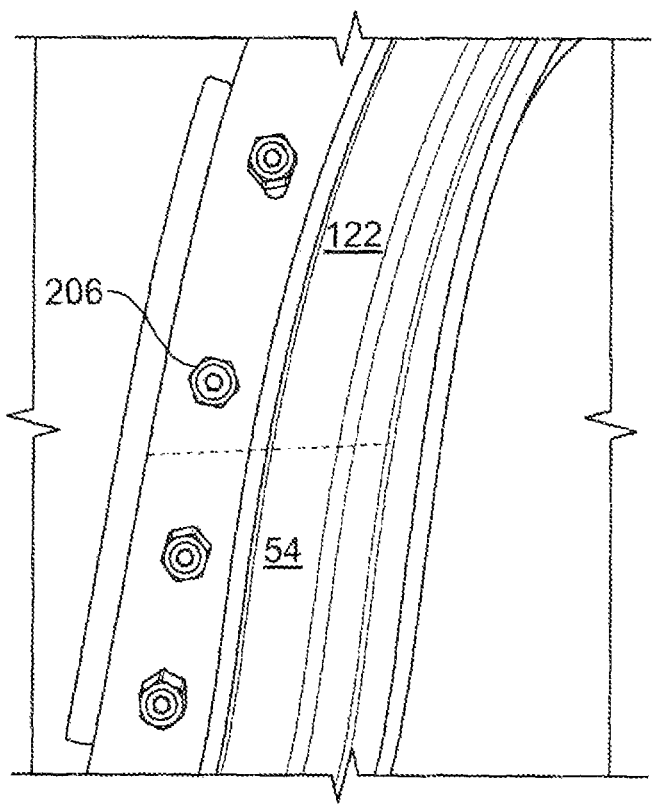

As illustrated in FIGS. 19, 20A and 20B, a mirror bracket 202, is preferably attached over the joint between the front window frame member 54 and the door top member 122. The bracket is held in place by bolts 204 which, as indicated in FIG. 20B pass through into the interior of the cab and are secured with nuts 206. This provides additional strength and rigidity between the door top member and the window frame member.

Figure 21:
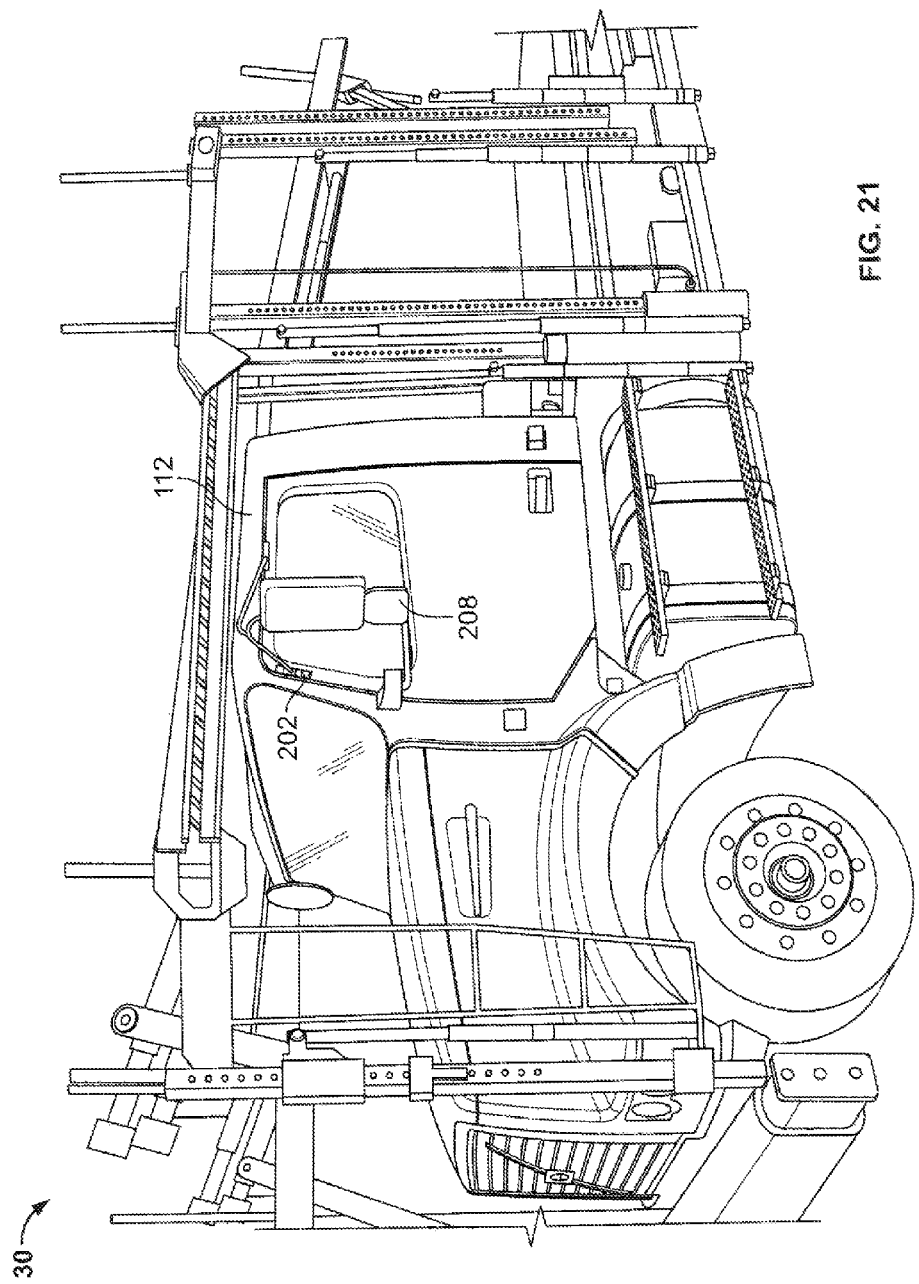
FIG. 21 is a perspective view of a truck configured as an auto carrier with the cab height modified in accordance with FIGS. 2-20B.

The mirror bracket 202 is illustrated in FIG. 21 installed on the modified truck 30 which now features a reduced cab height after the procedure described above. A mirror assembly 208 is attached to the mirror bracket.

Due to the reduced cab height, including the shortened A-pillars, a reduced height windshield must be installed in the modified truck cab. As a result, it may be preferable to replace the original dual windshield wiper system with a triple windshield wiper system, illustrated at 124 in FIGS. 4 and 5. More specifically, the reduced height windshield dictates that the windshield wiper blades must be shortened. As a result, less than 85% of the windshield may be covered by the wipers. Many state laws require that at least 85% of the windshield is covered by the wipers. The triple windshield wiper system 124 of FIGS. 4 and 5 addresses this issue and is a bolt-in replacement for the OEM wiper system.

Figure 22:
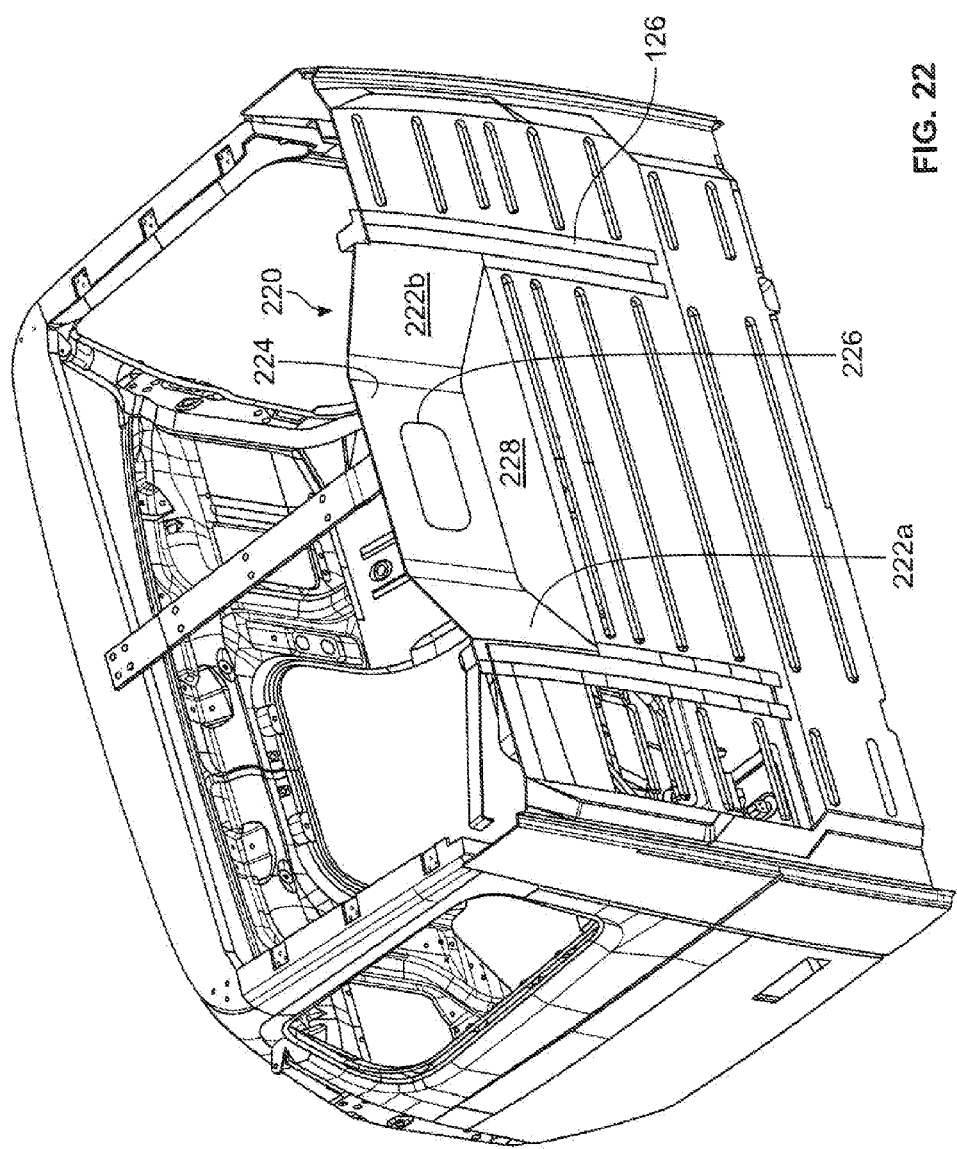
FIG. 22 is a rear perspective view of an embodiment of a truck cab modified with a housing that provides a wedge-shaped recess in the back wall and with the first and second door frame members, the door top members, the windshield header member and the central longitudinal flat bar strap assembled thereto.

As illustrated in FIG. 22, the modified truck cab of FIGS. 17 and 21 may be provided with a housing, indicated in general at 220 in FIGS. 22-25, that provides a generally wedge-shaped recess in the back wall of the truck cab, the housing features a pair of angled sidewalls 222a and 222b that are attached to and flank a central window panel 224, which is provided with rear window 226. A bottom panel 228 is attached along the bottom edges of the sidewall panels 222a and 222b and the central window panel 224.

The remaining portion of the cab of FIG. 22 has a construction that matches the cab of FIG. 17.

Figure 23:
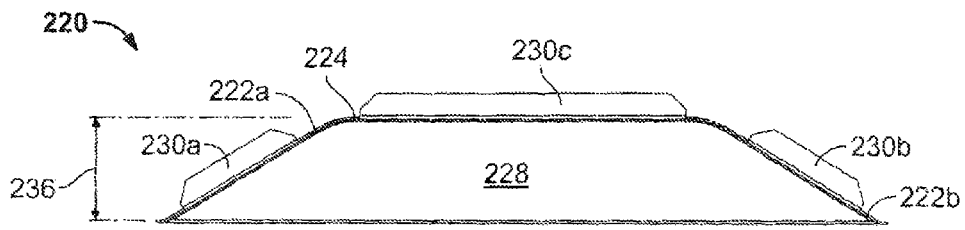
FIG. 23 is a top plan view of the housing of FIG. 22 prior to installation in a truck cab back wall.
Figure 24:
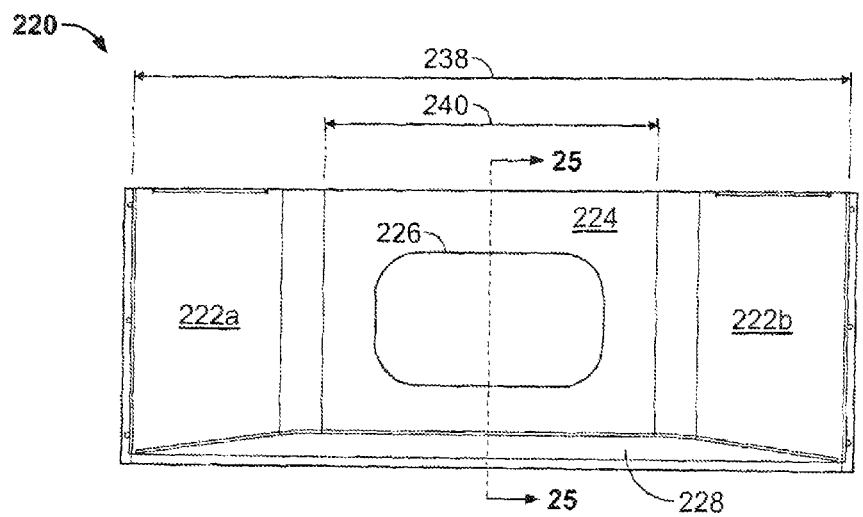
FIG. 24 is a front elevation view of the housing of FIG. 22 prior to installation.
Figure 25:
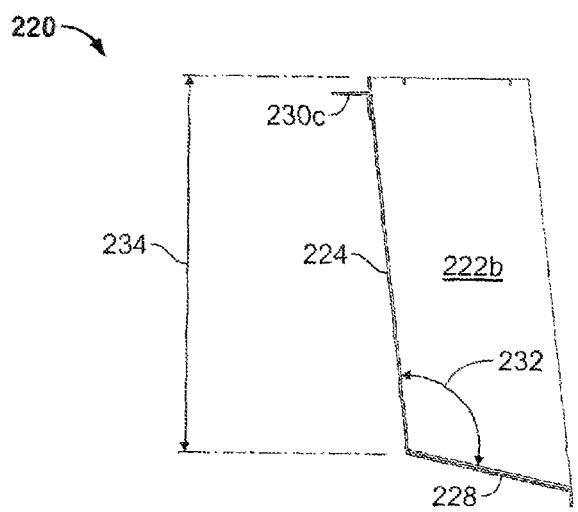
FIG. 25 is a cross sectional view of the housing of FIGS. 23 and 24 taken along line 25 of FIG. 24.

The sidewalls, central window panel and bottom panel are preferably constructed from steel and are attached together with adhesive and tack welds. As illustrated in tip, 22, the housing 220 is preferably welded into a cutout portion of the truck cab back wall between cab back wall uprights 126. As illustrated in FIGS. 23 and 25, the housing preferably includes tongue portions 230a, 230b and 230c to which the flat bar straps and other interior components may be attached to. The shape of the housing provides the benefit of interior shoulder room for the driver. Furthermore, the noses of most automobiles feature a rounded profile, which matches the wedge-shaped recess provided by the housing.

A wide range of dimensions and angles may be used when constructing housing 220. The most effective dimensions permit the nose of a vehicle being carried when the truck is configured as an auto-hauler (as shown in FIG. 21). Examples of approximate dimensions and angles are as follows (with respect to FIGS. 23-25): Angle 232: 109 degrees, Length 234: 14.5", Length 236: 6", Length 238: 43", Length 240: 20".

Figure 26:
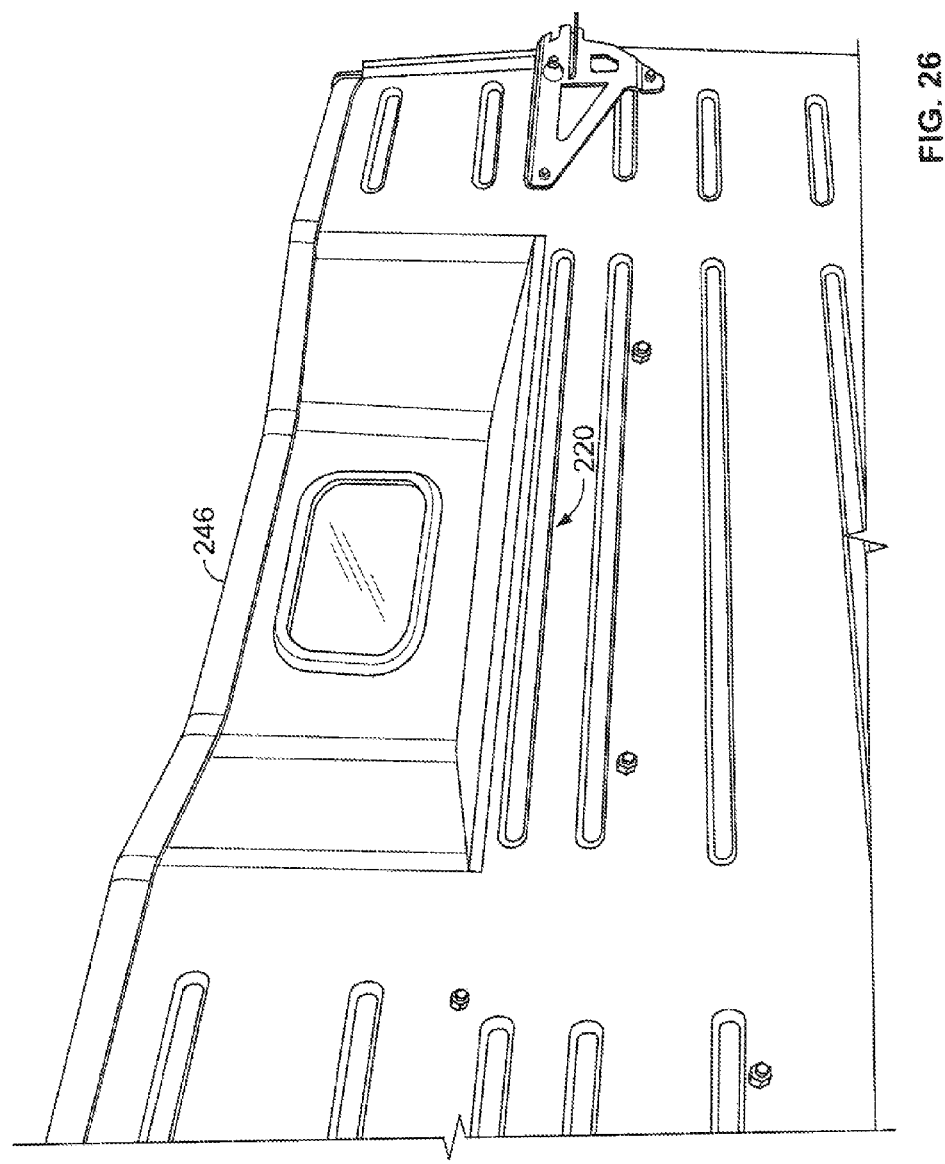
FIG. 26 is a rear perspective view of a truck cab with the cab height modified in accordance with FIGS. 2-20B and including a housing that provides a wedge-shaped recess in the cab back wall.

An illustration of the installed housing 220 is provided in FIG. 26. As indicated at 246, the roof panel of the cab is shaped to accommodate the housing so that the housing is open to the top.

While the preferred embodiments of the invention have been shown and described, it will be apparent to those skilled in the art that changes and modifications may be made therein without departing from the spirit of the invention, the scope of which is defined by the appended claims.

What is claimed is:

1. A kit for modifying a height of a truck cab having a back wall, a pair of A-pillars, a pair of B-pillars and a pair of doors, where each door includes a window frame, the kit comprising:
    a. a pair of first door frame members, each having a leading end and a trailing end, each trailing end adapted to be connected to one of the cab B-pillars;
    b. a pair of second door frame members, each adapted to be connected to one of the cab A-pillars and a leading end of one of the first door frame members;
    c. a windshield header member adapted to be connected between the pair of second door frame members;
    d. a longitudinal flat bar strap adapted to be connected between the windshield header member and the back wall;
    e. a lateral flat bar strap adapted to be connected between the pair of first door frame members;
    f. a roof panel adapted to be attached to and supported by the longitudinal and lateral flat bar straps, the windshield header member and the pair of first door frame members; and
    g. a pair of door top members, each adapted to be connected to a window frame of a door.

2. The kit of claim 1 wherein the cab back wall, pair of A-pillars, pair of B-pillars and pair of door window frames are cut and the pair of A-pillars, pair of B-pillars and pair of door window frames each feature openings as a result and the trailing end of each first door frame member includes a tab that engages an opening of the one of the B-pillars, each second door frame member includes a tab that engages an opening of one of the A-pillars and each door top member includes a tab that engages an opening of the door window frame.

3. The kit of claim 2 wherein the leading ends of the first door frame members each include an alignment pin and wherein each second door frame member includes an alignment notch sized and positioned to receive the alignment pin of a corresponding first door frame member.

4. The kit of claim 2 wherein the tabs of the pair of first door frame members, tabs of the second pair of door frame members and tabs of the door top member are powder coated or painted.

5. The kit of claim 1 wherein the windshield header member includes underside notches adapted to receive top end portions of the pair of second door frame members.

6. The kit of claim 1 wherein the pair of first door frame members, the pair of second door frame members, the windshield header member, and the pair of door top members are made of cast aluminum.

7. The kit of claim 1 wherein the lateral and longitudinal flat bar straps are made of aluminum.

8. The kit of claim 1 wherein the roof panel is made of fiberglass.

9. The kit of claim 1 further comprising an auxiliary flat bar strap adapted to be secured on top of the longitudinal flat bar strap.

10. The kit of claim 1 wherein the pair of first door frame members, the pair of second door frame members, the windshield header member, and the pair of door top members are cored.

11. A modified truck cab roof assembly comprising:
    a. a pair of first door frame members;
    b. a pair of second door frame members secured to the pair of first door frame members;
    c. a windshield header member secured to the pair of second door frame members;

d. a plurality of flat bar straps secured to the first door frame members and the windshield header member;
e. a pair of door top members; and
f. a roof secured to the pair of first door frame members, the pair of second door frame members, the windshield header member, and the plurality of flat bar straps.

12. The roof assembly of claim 11 wherein the pair of first door frame members, the pair of second door frame members, the windshield header member, and the pair of door to members are made of cast aluminum.

13. The roof assembly of claim 11 wherein the plurality of flat bar straps are made of aluminum.

14. The roof assembly of claim 11 wherein the roof is made of fiberglass.

15. The roof assembly of claim 11 wherein substantially conformal portions of the first door frame members, the second door frame members, and the door top members are inserted into cut portions of pillars and door frames of a conventional truck cab, respectively.

16. The roof assembly of claim 15 wherein the substantially conformal portions are one or more of powder coated and painted to prevent corrosion and secured with one or more of an adhesive and screws/bolts.

17. The roof assembly of claim 11 further comprising a mirror bracket that is fastened to door top member and a window frame member.

18. The roof assembly of claim 11 wherein the roof is affixed to the aluminum fiat bar straps using an adhesive.

19. A method of modifying a height of a truck cab having a back wall, a pair of A-pillars, a pair of B-pillars and a pair of doors, where each door includes a window frame, the method comprising the steps of:
a. providing a pair of first door frame members;
b. providing a pair of second door frame members;
c. providing a windshield header member;
d. providing a longitudinal flat bar strap and a lateral flat bar strap;
e. providing a pair of door top members; and
f. providing a roof panel;
g. cutting the pair of A-pillars, pair of B-pillars and pair of door window frames;
h. attaching the pair of second door frame members to the cut pair of A-pillars;
i. attaching the pair of first door frame members to the cut pair of B-pillars and the pair of second door frame members;
j. attaching the windshield header member between the pair of second door frame members;
k. attaching the pair of door top members to the cut pair of door window frames;
l. attaching a longitudinal fiat bar strap between the windshield header member and the back wall of the cab;
m. attaching a lateral flat bar strap between the pair of first door frame members; and
n. attaching the roof panel to the longitudinal and lateral flat bar straps, the pair of first door frame members and the windshield header member.

20. The method of claim 19 further comprising the steps of providing a mirror bracket and attaching the mirror bracket between one of the attached door top members and cut door window frames.

21. The method of claim 19 wherein steps h. and i. are accomplished using memory foam and adhesive.

22. The method of claim 19 wherein steps h. and k. are accomplished by using adhesive and further comprising the steps of drilling holes in the cut pair of A-pillars and cut pair of door window frames and inserting the adhesive through the holes.

23. The method of claim 19 wherein step n. is accomplished with adhesive.

24. The method of claim 19 further comprising the step of welding a strap support bracket to the back wall of the truck cab and fastening a trailing end of the longitudinal flat bar strap to the strap support bracket.

25. The method of claim 19 further comprising the steps of:
o. providing a housing defining a wedge-shaped recess;
p. cutting the truck cab back wall;
q. installing the housing within the cut truck cab back wall.

26. The method of claim 19 further comprising the steps of:
o. cutting the truck cab back wall; and
p. installing a top rear window name portion.

27. The method of claim 26 wherein the top rear window frame portion is a portion of the original truck cab back wall.

28. A housing for installation within the back wall of a truck cab comprising:
a. a central panel having a window;
b. a pair of sidewall panels attached to opposite side edges of the central panel at an angler;
c. a bottom panel attached to a bottom edge of the central panel at an angle, said bottom panel also attached to bottom edges of the pair of side wall panels so that the housing defines a wedge-shaped recess;
d. said sidewall and bottom panels adapted to be secured to the back wall of the truck cab.

29. A truck cab comprising:
a. a back wall,
b. a roof panel
c. a pair of doors;
d. a housing positioned within the back wall, said housing including:
  i) a central panel;
  ii) a pair of sidewall panels attached to opposite side edges of the central panel at an angle;
  iii) a bottom panel attached to a bottom edge of the central panel at an angle, said bottom panel also attached to bottom edges of the pair of side wall panels so that the housing defines a wedge-shaped recess.

30. The truck cab of claim 29 wherein the central panel has a window.

* * * * *